(12) United States Patent
Farrell et al.

(10) Patent No.: US 12,520,004 B2
(45) Date of Patent: *Jan. 6, 2026

(54) CONTENT OUTPUT BASED ON CONTENT REQUESTS

(71) Applicant: Comcast Cable Communications, LLC, Philadelphia, PA (US)

(72) Inventors: Corey Farrell, Lansdowne, VA (US); Randall Hounsell, Glen Mills, VA (US); Michael Connelly, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,577

(22) Filed: Nov. 30, 2023

(65) Prior Publication Data

US 2024/0179205 A1 May 30, 2024

Related U.S. Application Data

(63) Continuation of application No. 17/569,241, filed on Jan. 5, 2022, now Pat. No. 11,888,914, which is a continuation of application No. 14/461,225, filed on Aug. 15, 2014, now Pat. No. 11,252,213.

(60) Provisional application No. 61/866,390, filed on Aug. 15, 2013.

(51) Int. Cl.
*H04L 65/75* (2022.01)
*H04L 65/65* (2022.01)
*H04L 65/756* (2022.05)
*H04L 65/80* (2022.01)
*H04N 21/433* (2011.01)
*H04N 21/4335* (2011.01)
*H04N 21/436* (2011.01)
*H04N 21/4363* (2011.01)
*H04N 21/4402* (2011.01)
*H04N 21/442* (2011.01)
(Continued)

(52) U.S. Cl.
CPC ......... *H04N 21/4363* (2013.01); *H04L 65/65* (2022.05); *H04L 65/75* (2022.05); *H04L 65/756* (2022.05); *H04L 65/80* (2013.01); *H04N 21/4331* (2013.01); *H04N 21/4335* (2013.01); *H04N 21/43615* (2013.01); *H04N 21/4402* (2013.01); *H04N 21/44227* (2013.01); *H04N 21/4516* (2013.01); *H04N 21/632* (2013.01)

(58) Field of Classification Search
CPC ... H04N 21/4363; H04L 65/756; H04L 65/75; H04L 65/65
See application file for complete search history.

(56) References Cited

U.S. PATENT DOCUMENTS 5,485,279 A 1/1996 Yonemitsu et al.
6,230,200 B1 5/2001 Forecast et al.
6,330,068 B1 12/2001 Matsuyama
(Continued)

*Primary Examiner* — Nazia Naoreen
(74) *Attorney, Agent, or Firm* — Banner & Witcoff, Ltd.

(57) ABSTRACT

Aspects of the disclosure relate to a content fling system and method. The content fling system may support a plurality of users flinging content or media at various times including simultaneously to the same output device. The content fling system may further support users flinging from various locations. The content fling system can also support a single content item being played back on a plurality of output devices.

28 Claims, 6 Drawing Sheets

(51) Int. Cl.
*H04N 21/45* (2011.01)
*H04N 21/63* (2011.01)

(56) References Cited

U.S. PATENT DOCUMENTS

| | | |
|---|---|---|
| 6,931,534 B1 | 8/2005 | Jandel et al. |
| 7,117,241 B2 | 10/2006 | Bloch et al. |
| 7,301,944 B1 | 11/2007 | Redmond |
| 7,574,451 B2 | 8/2009 | Burges et al. |
| 7,664,697 B2 | 2/2010 | Takayama |
| 7,840,620 B2 | 11/2010 | Vignoli et al. |
| 8,028,323 B2 | 9/2011 | Weel |
| 8,060,638 B2 | 11/2011 | Kapoor |
| 8,169,916 B1 | 5/2012 | Pai et al. |
| 8,224,964 B1 | 7/2012 | Fredrickson et al. |
| 8,423,071 B1 | 4/2013 | Sun |
| 8,544,046 B2 | 9/2013 | Gran et al. |
| 8,577,411 B2 | 11/2013 | Adachi et al. |
| 8,610,603 B2 | 12/2013 | Lai et al. |
| 8,818,277 B2 | 8/2014 | Chen |
| 8,935,279 B2 | 1/2015 | Skeen et al. |
| 8,977,763 B1 | 3/2015 | Brown et al. |
| 9,179,199 B2 | 11/2015 | Alsina et al. |
| 9,436,929 B2 | 9/2016 | Oliver et al. |
| 9,462,032 B2 | 10/2016 | Lieber |
| 9,955,225 B1 | 4/2018 | Wood |
| 2001/0040886 A1 | 11/2001 | Jimenez et al. |
| 2002/0087887 A1 | 7/2002 | Busam et al. |
| 2002/0099766 A1 | 7/2002 | Tuli |
| 2002/0107944 A1 | 8/2002 | Bai et al. |
| 2002/0194121 A1 | 12/2002 | Takayama |
| 2002/0194483 A1 | 12/2002 | Wenocur et al. |
| 2004/0139318 A1 | 7/2004 | Fiala et al. |
| 2004/0249723 A1 | 12/2004 | Mayer |
| 2005/0188406 A1 | 8/2005 | Gielow et al. |
| 2006/0080703 A1 | 4/2006 | Compton |
| 2007/0107026 A1 | 5/2007 | Sherer et al. |
| 2007/0136322 A1 | 6/2007 | Cormack et al. |
| 2007/0174471 A1 | 7/2007 | Van Rossum |
| 2007/0226338 A1 | 9/2007 | Burch et al. |
| 2008/0072261 A1 | 3/2008 | Ralston et al. |
| 2008/0091717 A1 | 4/2008 | Garbow et al. |
| 2008/0098101 A1 | 4/2008 | Black et al. |
| 2008/0177994 A1 | 7/2008 | Mayer |
| 2008/0220767 A1 | 9/2008 | Aretz et al. |
| 2008/0250458 A1 | 10/2008 | Roman |
| 2008/0282295 A1 | 11/2008 | Gabriel et al. |
| 2009/0165062 A1 | 6/2009 | Harris et al. |
| 2009/0282437 A1* | 11/2009 | Malec ................ G06F 3/1423 725/40 |
| 2010/0023578 A1 | 1/2010 | Brant et al. |
| 2010/0057872 A1 | 3/2010 | Koons et al. |
| 2010/0146580 A1* | 6/2010 | Chen .................. G06F 11/14 725/148 |
| 2010/0169502 A1 | 7/2010 | Knowlson et al. |
| 2010/0169514 A1* | 7/2010 | Noguchi ............ H04L 65/1063 710/19 |
| 2010/0169910 A1 | 7/2010 | Collins et al. |
| 2010/0198982 A1 | 8/2010 | Fernandez |
| 2010/0223407 A1 | 9/2010 | Dong et al. |
| 2010/0248786 A1 | 9/2010 | Charriere |
| 2010/0332754 A1 | 12/2010 | Lai et al. |
| 2011/0041065 A1 | 2/2011 | Bangma et al. |
| 2011/0106969 A1 | 5/2011 | Choudhury et al. |
| 2011/0148932 A1 | 6/2011 | Niemi et al. |
| 2011/0161815 A1 | 6/2011 | Iwahara |
| 2011/0307548 A1 | 12/2011 | Fisk et al. |
| 2012/0089674 A1 | 4/2012 | Staykoff |
| 2012/0089675 A1 | 4/2012 | Thrower, III et al. |
| 2012/0136929 A1 | 5/2012 | Li et al. |
| 2012/0151006 A1 | 6/2012 | McInerney et al. |
| 2012/0232681 A1 | 9/2012 | Mundy et al. |
| 2012/0311648 A1 | 12/2012 | Swildens et al. |
| 2013/0013740 A1 | 1/2013 | Liu et al. |
| 2013/0054742 A1* | 2/2013 | Tsuji ................ H04N 21/4122 709/217 |
| 2013/0097516 A1 | 4/2013 | Hong et al. |
| 2013/0117385 A1* | 5/2013 | Pasko ................ H04W 4/50 709/206 |
| 2013/0238777 A1 | 9/2013 | Raleigh et al. |
| 2013/0318206 A1* | 11/2013 | Hsiao ................ H04L 67/60 709/219 |
| 2014/0026201 A1 | 1/2014 | Srinivasan et al. |
| 2014/0108929 A1 | 4/2014 | Garmark et al. |
| 2014/0115114 A1 | 4/2014 | Garmark et al. |
| 2014/0156781 A1 | 6/2014 | Childs et al. |
| 2014/0282295 A1 | 9/2014 | Huang et al. |
| 2015/0032851 A1 | 1/2015 | Lieber |
| 2015/0067150 A1 | 3/2015 | Heredia et al. |
| 2015/0301981 A1 | 10/2015 | Huang et al. |
| 2015/0341812 A1 | 11/2015 | Dion et al. |
| 2015/0373140 A1 | 12/2015 | Haenel et al. |
| 2015/0382054 A1 | 12/2015 | Rao et al. |
| 2016/0261657 A1 | 9/2016 | Bruhn et al. |

\* cited by examiner

CONTENT OUTPUT BASED ON CONTENT REQUESTS

CROSS-REFERENCE TO RELATED APPLICATIONS

This application is a continuation of and claims priority to U.S. patent application Ser. No. 17/569,241, filed Jan. 5, 2022, which is a continuation of U.S. patent application Ser. No. 14/461,225, filed Aug. 15, 2014 (now U.S. Pat. No. 11,252,213), which claims the benefit of U.S. Provisional Application No. 61/866,390, filed Aug. 15, 2013, each of which is hereby incorporated by reference in its entirety.

BACKGROUND

Current solutions in the market allow personal media (videos, photos, and music) to be sent from a mobile device to a media renderer connected to a consumer television. This "fling" capability is currently not consistent and riddled with consumer use problems and technical limitations. Some issues include: a) lack of quality and reliability due to network limitations and network configuration, b) limitations of various file types, codecs and other environment specific considerations; c) lack of a ubiquitous environment across DLNA, Airplay (Apple) and other protocols; d) lack of end to end monitoring and QoS (Quality of Service) since the service needs to be managed across source device and target device, and e) lack of consistent user experience across apps and devices.

None of these solutions have garnered mass adoption. The Digital Living Network Alliance (DLNA) is perhaps the most used system today. DLNA guidelines specify ways of achieving interoperability but have the disadvantage of excluding most free audio formats and most common video formats. DLNA uses Universal Plug and Play (UPnP) for media, defines the type of device (e.g., "server," "renderer," and "controller") and specifies techniques for accessing media over a network. DLNA has many restrictions over the types of media file formats, encodings and resolutions, and these limitations have limited wide spread adoption of DLNA.

In DLNA solutions today, the time between when a user clicks on her mobile device and when the content appears or begins playing on the TV is usually at least four seconds. This amount of latency presents significant issues especially when users "swipe" through a number of photos quickly. Although some device manufacturers (e.g., HP) have attempted to use techniques such as Twonky Media Server and PacketVideo to alleviate some of the deficiencies of DLNA, these systems do not currently work effectively. Even in closed environments such as Apple's AirPlay, the latency can be 2 seconds or more. In DLNA solutions today, users frequently experience buffering and freezing when they send video to the TV. The video quality is far superior when users simply play on their mobile device versus compared to when they output over Wi-Fi to their TV. In order to establish the required connection between a mobile and TV device to enable flinging today, users need to go through a number of complicated steps. DLNA solutions often involve 1) connecting the TV to the Wi-Fi network and entering WPA credentials, 2) using a mobile phone to manually scan for other DLNA devices on their home network, and 3) configuring the TV to approve mobile devices that can fling to that TV. Users often balk at one of these steps, and thus remain as a practical matter generally unable to render mobile device content on other screens such as TV screens. Additionally, there are many competing standards including AirPlay, DLNA, and Miracast and even within some of these standards there are conflicting protocols. The above mentioned problems can result in issues for consumers including 1) the inability to detect rendering devices and 2) unsuccessful flinging experiences, where the rendering device cannot render the content, and 3) poor quality experiences that include frozen video and substantial latency.

SUMMARY

The following summary is for illustrative purposes only, and is not intended to limit or constrain the detailed description.

Some features herein relate to aspects of a content (e.g., media) transfer or fling platform or system and method. The media fling system may support a plurality of users sending, transferring, or flinging content, e.g., media, at various times, including at different times or simultaneously to the same output device. The media fling system may further support users flinging from various locations. The disclosed media fling system can also support single or multiple content items being played back concurrently, simultaneously, or synchronously on a plurality of output devices.

In some aspects, a rendering device may include a coordination manager, an orchestration manager (e.g., a server or processor), and a cache. The orchestration manager may supervise partitioning the cache, and the cache may be partitioned into private portions for individual users and/or electronic devices and into a public or common portion. Access to media stored in the private portions may be limited to the originating electronic device (e.g., the device which placed or transferred the media to the cache) while access to media stored in the public or common portion may be enabled to any device able to connect to the rendering device.

In another aspect, an electronic device may be given master control of the rendering device including all fling requests pending at the rendering device. Using the electronic device, a user may control playback of media at the rendering device as well as the order of playback of various fling requests from different electronic devices.

The summary provides some examples and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
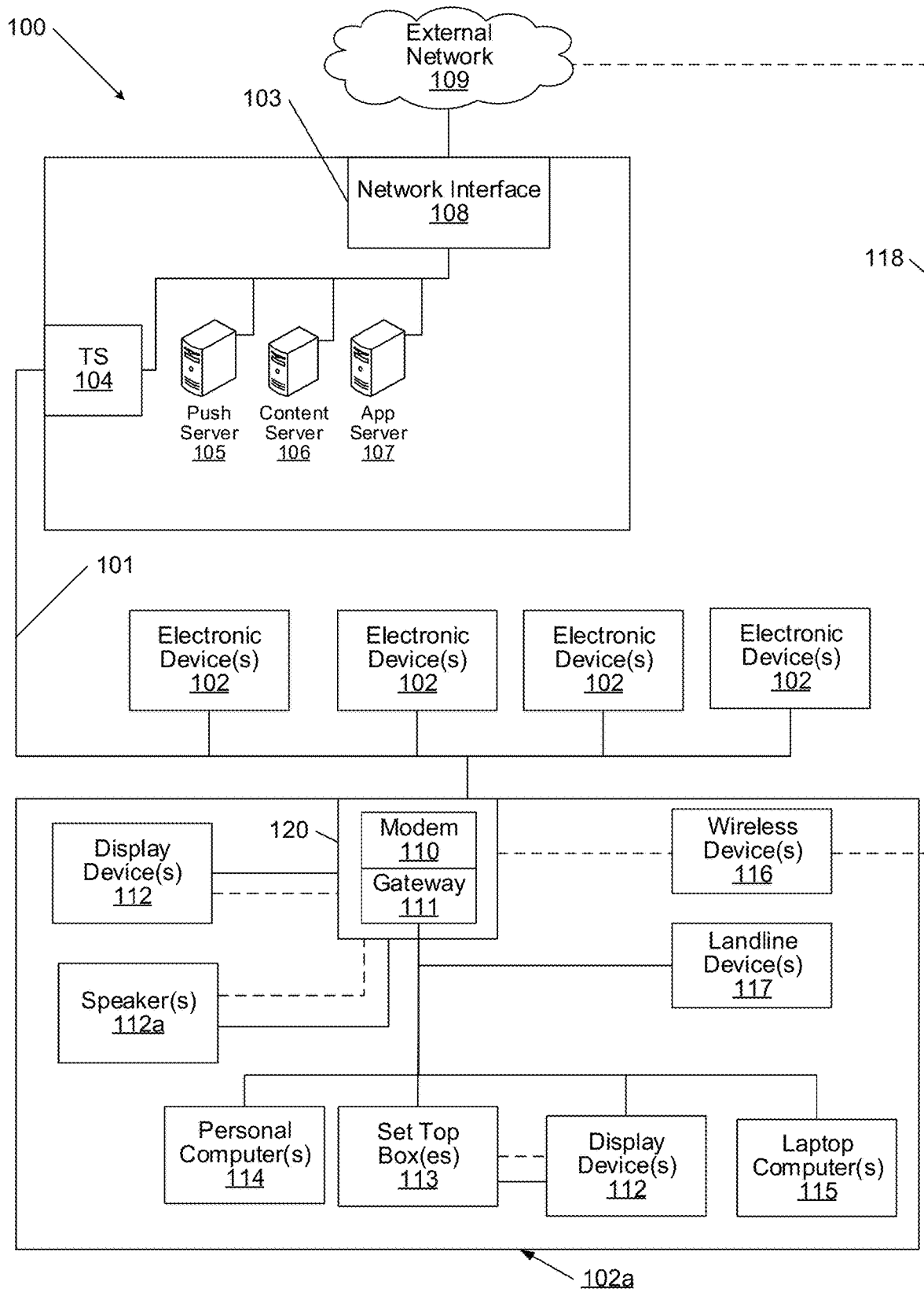
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects described herein may relate to a media transfer or fling platform or system. Various aspects of the media fling system are also described in related applications U.S. patent application Ser. No. 14/461,207, filed Aug. 15, 2014 (now U.S. Pat. No. 9,906,575), and U.S. patent application Ser. No. 14/461,213, filed Aug. 15, 2014 (now U.S. Pat. No. 9,948,690), both of which are hereby incorporated by reference herein in their entirety. The media fling system may support flinging of media content to output device(s). Media may be flung under control of a computing device to an output device(s). The media may be flung from media stored on the computing device or media stored in other devices which may be accessed via a network. The computing device may facilitate the transmission of the media to the output device(s). For example, the computing device may control transmission of the media content to a rendering device in communication with and/or connected to the output device(s).

In some aspects, the media fling platform may provide users with an effortless experience to enjoy their own content through: 1) Accessing content stored in various places on their home network or in the cloud, 2) Using one or more mobile devices to control their content on various connected devices across mobile and fixed networks, 3) Optimizing the delivery of the content between the source and the renderer, and 4) Enabling content access, control, and rendering across mobile and fixed networks. The platform may be configured to enable users to navigate and control their own content using their mobile devices while viewing and consuming the content on their TV.

A user's "own" content may, for example, include 1) personal media such as photos, video, and music 2) professional and semi-professional content such as movies. The content may be stored in the mobile devices themselves, personal, public, and/or semi-private clouds, home PC, network attached storage (NAS), Internet Video Services, and/or third party clouds. Embodiments of the platform may include one or more DLNA server(s), content controller(s), Miracast and/or multicast server(s), audio server(s) including queuing controller, zone controllers and synchronization controllers, client application logging such as determining user analytics, rendering device controls such as operator selectors, device resets, factory default and configurable settings, business logic, DMR filters and compatible renderers, transcoders, server orchestrator (mediates contention between streaming protocol servers), cloud tune for assets located in cloud, application white-list check for administrative functions (e.g. operator selector, device reset, factory default), re-encapsulation media assets to support incompatible renderers, transcoding of media assets to support incompatible renderers, and enforcement of DTCP content protection for premium paywall content. The platform rendering device may include one or more DLNA renderer(s), player(s) including queue(s), Miracast and/or multicast renderer(s), audio renderer(s) including queue, zone controller and synchronization manager, client analytics, rendering device control(s), and business logic. Content may be accessed and rendering devices may be recognized across LAN and WAN networks and across mobile and fixed networks. The platform may also include one or more tuned video pipeline(s), one or more buffering platform(s) for handling multiple video media types, one or more server orchestrator(s) for mediating contention between streaming protocol servers, one or more Wi-Fi optimizations specifically tuned to allow consistent QoS from any platform capable mobile device and application.

The fling platform in many embodiments may be portable across mobile operating systems as well as various types of rendering devices.

With mobile phones increasingly fulfilling multiple functions for users including as cameras and video recorders, the Fling platform may be configured to seamlessly take those events and allow users to move it from the small screen in their hands to another screen such as the television without the user having to be aware of whether they had an iPhone/iPad, Microsoft tablet, an Android device, or some other mobile and/or handheld/hand-holdable device.

FIG. 1 illustrates an example communication network 100 on which many of the various features described herein may be implemented. Network 100 may be any type of information distribution network, such as a fiber, hybrid/fiber coax, internet, Internet, intranet, satellite, telephone, cellular, wired, and/or wireless, etc. Examples may be a wireless phone network, an optical fiber telecommunication network, a coaxial cable distribution network, and/or a hybrid fiber/coax distribution network. Such networks 100 may be configured to use a series of interconnected communication links 101 (e.g., coaxial cables, optical fibers, wireless, etc.) to connect multiple electronic devices 118 (e.g., computers, laptop, set-top boxes, tablets, smart phones, televisions, terminals, networks, etc. remotely located at, for example, businesses, homes, consumer dwellings or other locations remote from the central communication system) to central communication system 103 such as an internet, Internet, local office, server, internal and/or external network and/or headend. The central communication system 103 may transmit downstream information signals onto one or more links 101, and the electronic devices 102 may have one or more communication devices to receive and process various signals from the links 101.

There may be one link 101 originating from the central communication system 103, and it may be split and/or repeated a number of times to distribute the signal to various electronic devices 102 in the vicinity (which may be many miles) of the central communication system 103. The links 101 may include components not illustrated, such as splitters, repeaters, filters, amplifiers, etc. to help convey the signal clearly. Portions of the links 101 may also be implemented with fiber-optic cable, while other portions may be implemented with coaxial cable, other lines, and/or wireless communication paths.

The central communication system 103 may include an interface, such as a termination system (TS) 104. More specifically, the interface 104 may be a cable modem termination system (CMTS), which may be a computing device configured to manage communications between devices on the network of links 101 and backend devices such as servers 105-107. The interface 104 may be as specified in a standard, such as any of the standards used on the Internet (e.g., IP), any connection or connectionless protocol, the Data Over Cable Service Interface Specification (DOCSIS) standard, published by Cable Television Laboratories, Inc. (a.k.a. CableLabs), or it may be a similar or modified device instead. In other embodiments, the interface 104 may be a wireless receiver. The interface 104 may be configured to place data on one or more downstream frequencies to be received by modems located with the various electronic devices 102, and to receive upstream communications from those modems on one or more upstream frequencies.

The central communication system 103 may also include one or more network interfaces 108, which can permit the central communication system 103 to communicate with various other external networks 109. These networks 109 may include, for example, networks of Internet devices/servers/locations, internet devices, Intranet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones. Further, central communication system 103 may itself form a part of a larger communication network. In various exemplary embodiments, those networks may be a private network, the internet, and/or the Internet.

As noted above, the central communication system 103 may include a variety of servers 105-107 that may be configured to perform various functions. The servers 105-107 may themselves comprise other servers and/or load balancing networks. For example, the central communication system 103 may include a push notification server 105. The push notification server 105 may generate push notifications to deliver data and/or commands to the various electronic devices 102 in the network (or more specifically, to the devices associated with the electronic devices 102 that are configured to detect such notifications). The central communication system 103 may also include a content server 106. The content server 106 may be one or more computing devices that are configured to provide content to electronic devices. This content may be, for example, video on demand movies, television programs, songs, text listings, etc. The content server 106 may include software to validate user identities and entitlements, to locate and retrieve requested content, to encrypt the content, and/or to initiate delivery (e.g., streaming) of content to the requesting user(s) and/or device(s).

The central communication system 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the electronic devices 102. Although shown separately, one of ordinary skill in the art will appreciate that the push server 105, content server 106, and application server 107 may be combined. Further, in FIG. 1, the push server 105, content server 106, and application server 107 are shown generally, and it will be understood that they may each contain memory storing computer executable instructions to cause a processor to perform steps described herein and/or memory for storing data and function in accordance with any of the algorithms described herein.

An example of the electronic devices 102 is shown in more detail as a collection of electronic devices 102a (e.g., a cell phone, tablet, set-top box, television, and/or laptop) and may optionally include an interface 120. The interface 120 can include any communication circuitry needed to allow a device to communicate on one or more links 101 with other devices in the network. For example, the interface 120 may include a modem 110, which may include transmitters and receivers used to communicate on one or more of the links 101 and with the central communication system 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. For example, some of these modems may be wired, some may be wireless such as 802.11 and/or 4G, and others may be suitable to other technologies such as WiMax and/or fiber.

Further, the interface 120 may include a gateway interface device 111. The modem 110 may be connected to, or be a part of, the gateway interface device 111. The gateway interface device 111 may be a computing device that communicates with the modem(s) 110 to allow one or more of the electronic devices 102a, to communicate with the central communication system 103 and other devices beyond the central communication system 103. The gateway 111 may be a set-top box (STB), digital video recorder (DVR), computer server, or any other desired computing device such as a phone, tablet, and/or laptop. The gateway 111 may also include (not shown) local network interfaces to provide communication signals to requesting entities/devices associated with the electronic devices 102a, such as display devices 112 (e.g., televisions, tablets), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol-VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. The wireless devices 116 may connect to the links 101 via the interface 120 or via a wireless communication link 118 with the external network 109. The wireless communication link 118 may be a cellular connection or a connection to a wireless wide area network (WWAN).

Figure 2:
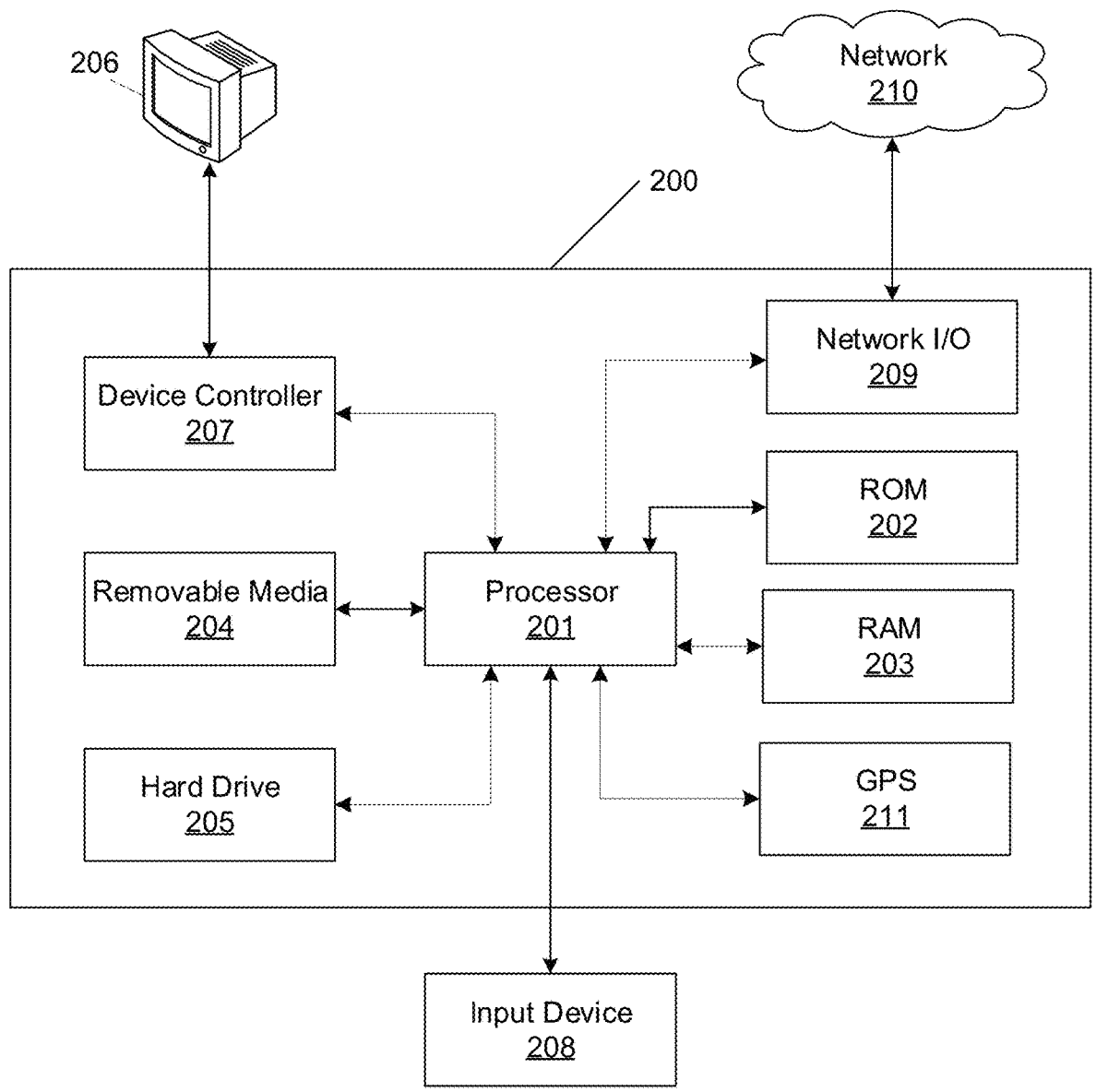
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The processor may include one or more decoders for video compression and/or decompression. In some devices such as cellular telephones and/or tablets, the processor 201 may include a single decoder for video. The instructions for the processor 201 may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205.

The computing device 200 may include one or more output devices, such as a display 206 (e.g., an external television), and may include one or more output device controllers 207, such as a video processor (e.g., a macroblock video decoder such as AVC/H.264). There may also be one or more user input devices 208, such as a remote control, keyboard, mouse, touch screen, smart phone, tablet, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem, fiber modem, and/or wireless modem), and the external network 210 may include the communication links 101 discussed above, the external network 109, an in-home network, a provider's wireless, coaxial, fiber, hybrid fiber/coaxial distribution system (e.g., a DOCSIS network), and/or any other desired network. Additionally, the device may include a location-detecting device, such as a global positioning system (GPS) microprocessor 211, which can be configured to receive and process global positioning signals and determine, with possible assistance from an external server and antenna, a geographic position of the device. In some embodiments, the computing device 200 may include a Digital Living Network Alliance (DLNA) compliant protocol renderer, AirPlay (a registered trademark of Apple) compliant renderer, or other rendering device for receiving flung content and rendering it onto one of the output devices such as displays and/or speakers.

The examples in FIG. 1 and FIG. 2 may be modified in various ways. For example, modifications may be made to add, remove, combine, divide, etc. components of the computing device 200 and/or communication network 100 as desired. Additionally, the components illustrated may be implemented using basic computing devices and components, and the same components (e.g., processor 201, ROM storage 202, display 206, etc.) may be used to implement any of the other computing devices and components described herein. For example, the various components herein such as those in FIG. 1 may be implemented using computing devices having components such as a processor executing computer-executable instructions stored on a computer readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
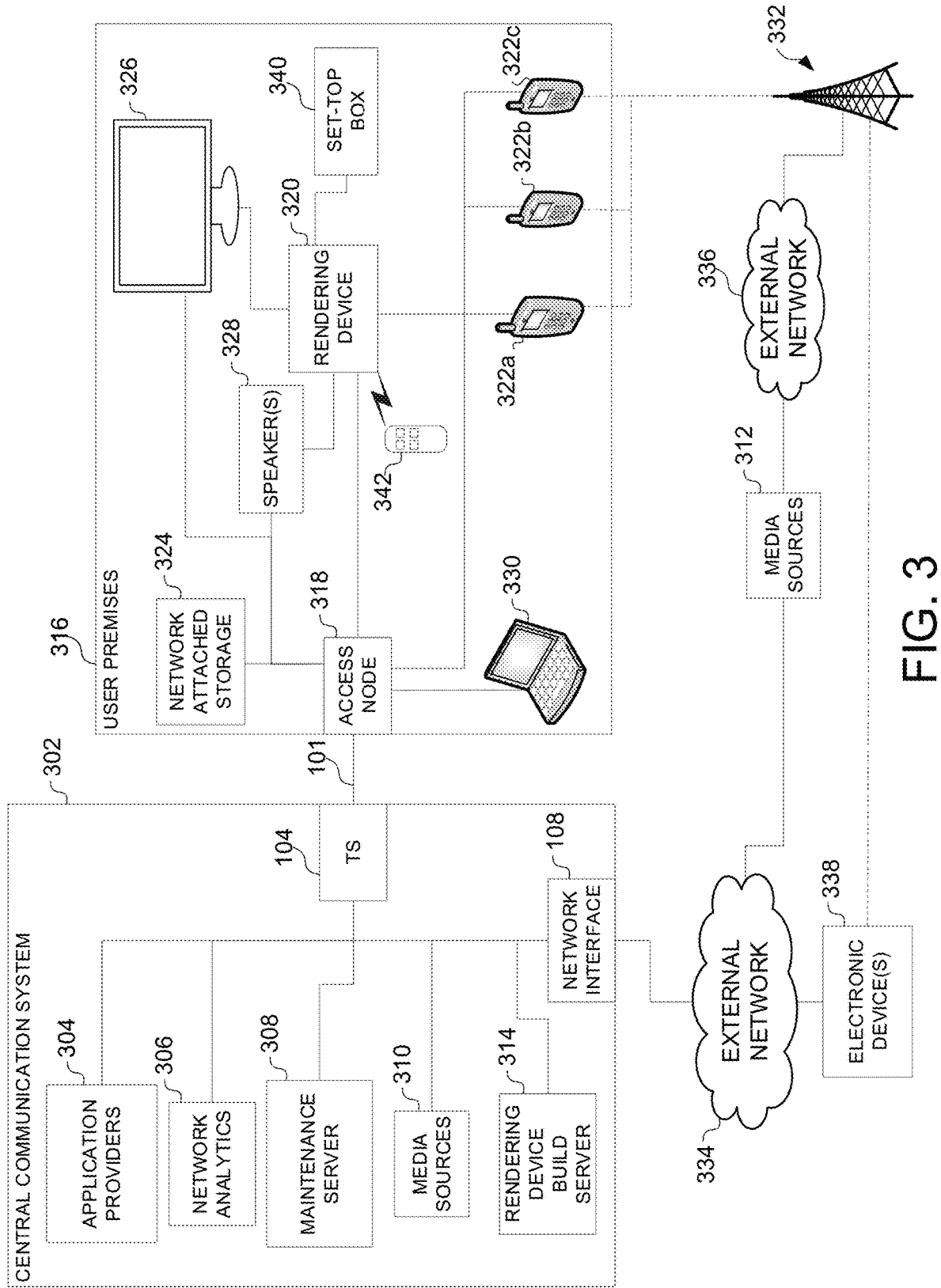
FIG. 3 illustrates an example media fling system according to various aspects of the disclosure described herein.

FIG. 3 illustrates an example of a media fling platform or system 300 in accordance with some aspects of the disclosure. While the media fling platform 300 may be variously configured (including configurations shown in FIGS. 1-2), an alternate configuration is shown in FIG. 3. In one embodiment, the media fling platform 300 may include one or more of the components as shown. The media fling system 300 may include a central communication system 302 and a user premises 316.

The central communication system 302 may be configured similar to the central communication system 103. The central communication system 302 may further include servers or computing devices 304, 306, 308, 310, which can perform various functions. The servers or computing devices included in the central communication system 302 may communicate with electronic devices at a user premises 316 via communication links such as communication links 101. The central communication system 302 may communicate with devices at the user premises 316 via the termination system (TS) 104 of the central communication system and access node 318 at the user premises 316. The central communication system 302 may communicate with external network(s) 334 via network interface 108. The central communication system 302 may include application providers 304, network analytics 306, maintenance server 308, and media sources 310.

The application providers 304 may be a server(s) hosting an application store or providing applications for flinging and/or configuring the media fling platform 300. The application store may serve as the source of flung media content.

The network analytics server 306 may provide data analysis of the various networks within and around the user premises 316 and between the user premises 316 and various external sources such as the central communication system 302 and/or network attached resources. The network analytics server 306 may be configured to analyze various types of traffic on the different networks, devices, and system. The network analytics server 306 may receive data relating to all fling platform functions such as flung media, transcoding, rendering, encoding, and resolution to the most efficient parameters to enhance the user experience based on measured performance values such as buffering, paused video, network congestion, competing flung media, and output device capabilities and availability. The network analytics server 306 can also be used to analyze the overall "health" of the platform, customer usage statistics and trending and longer term business intelligence.

The maintenance server 308 may provide a mechanism to collect, index and harness data (e.g., machine data, media data, media flows, program flows, game flows and other data) generated by flung media and applications, as well as associated networks, servers and devices including physical devices/networks, virtual devices/networks and cloud based devices/networks. The maintenance server 308 allows the media fling platform to troubleshoot application problems in real-time, investigate security warnings and flings in realtime in order to avoid service degradation or outages associated with the media fling platform to deliver a more robust and reliable user experience. The maintenance server 308 may be configured to receive various event data including crash logs, latency parameters, and run network analytics to determine and correct issues that may impact user experience before they impact the user media fling experience. Such issues might include microwave interference with a wireless network frequency range and switching the preferred fling network channel to certain display and/or rendering devices responsive to environmental condition changes. The maintenance server also allows for the ability to merge disparate data across sources in order to drive better operational analytics across the fling platform. One example of this is the ability to correlate data from the source fling application (on the mobile device) to the target fling device (rendering device connected to an output display device (e.g., television)) and determine start and end fling times. This data can be used to monitor and manage service level agreements and other operational monitoring required to ensure a good quality of service.

Media sources 310 may include a variety of server or computing devices that store or otherwise provide access to media or media content including but not limited to pictures, videos, games, comments, slides, music, postings, web content, etc. The media sources 310 may include network sources and/or applications such as social network applications including Facebook, Twitter, Instagram, or other proprietary applications such as those hosted by media or network providers including Comcast, Verizon, Time Warner, Disney, NBC, AT&T, Netflix, Hulu, etc. Additionally, the application store 304 may be the source of flung media content, for example, purchased media content (e.g., movies, tv shows). Further, content need not reside within a mobile application or in a cloud network source. Media content may also be stored on a home network device such as a computer 330 or network attached storage (NAS) 324 which may be used as a source device of flung media. The media sources 310 may be included in the central communication system 302 or be accessed through an external network such as external networks 109, 334, 336.

Turning to the devices at the user premises 316, one or more access interfaces or nodes 318 may be provided at the user premises 316. The interface 318 may be implemented similar to interface 120 and may include a gateway interface device 111 and modem 110 to communicate with the central communication system 302. Various electronic devices 320, 322, 324, 328, 330, may be connected to the access interface 318 to communicate with the central communication system 302 and with other devices connected to the access interface 318. The electronic devices 320, 322, 324, 328, 330 connected to the access interface 318 may form a network at the user premises 316. The connections between the electronic devices 320, 322, 324, 328, 330 may be wired and/or wireless connections.

One or more electronic devices 322a-c may be present and flinging at the user premises 316. The electronic device 322a-c may be flinging over the same or different network to the rendering device 320. For example, access node 318 may include a gateway device that supports dual access points such as a private wireless network and a public wireless network. The private wi-fi may be a user configurable wireless network (e.g., wi-fi) such that the user can define the identifier (e.g., service set identifier (SSID)) of the wireless network and the password to gain access to the private wireless network. In one aspect, the public wireless network may be an access point which does not require a password to obtain access to the public wireless network. The public wireless network may be segregated from the private wireless network such that users connected to the public wireless network generally do not have access to devices connected to the private wireless network without special settings. A user connected to the public wireless network may fling to rendering device 320 connected to the private network by opening a port on the rendering device 320 for a fling service via the public wireless network.

In another aspect, the public wireless network may be a wireless network where the settings for the network are defined by the service provider. For example, the service provider may enable and/or authorize any subscribers of the service provider to use the public wireless network provided by the gateway. A user of an electronic device connected to the public wireless network of the gateway may fling to devices connected to the same gateway such as devices connected to the public or private network. The traffic of the fling user connected to the public network may traverse the different subnetworks (e.g., private subnetwork, public subnetwork) to fling to a device connected to the private subnetwork. Enabling a user connected to the public network to fling to devices connected on the private networks is advantageous because the user does not need to be given credentials or the password of the private network in order to fling media to devices on the home or private network.

According to another aspect, an electronic device may have a connection to a cellular or mobile network (332) and may fling media via the mobile network (332). Some of the devices at the user premises 316 may be able to connect to more than one type of network and fling content over more than one network. For example, electronic device 322 may be an electronic device with cellular network connection capabilities such as a mobile phone, laptop, or tablet device which can connect with access node 318 and an external cellular network 332, 336. Via the external network 332, 336, the electronic device 322 can also access various media sources 310.

Electronic device(s) 338 (e.g., computers, laptop, set-top boxes, tablets, smart phones, televisions, terminals, networks, etc.) may be connected to various external networks such as external network 334 and connected to a cellular network 332. The electronic device(s) 338 may be located outside of the user premises 316 and fling media via connected networks to other devices including other electronic devices and rendering device 320.

As will be described herein in more detail, a user may use the electronic device 322 and associated applications to fling content to one or more output devices (e.g., television 326, speaker(s) 328, computer 330) via a rendering device 320. The flung content may include applications, photos, videos, games, music, files, and/or other data stored remotely from the electronic device 322, in the electronic device 322, or locally (e.g., NAS 324, computer 330). These mobile devices and associated applications 314 may initiate and control the media fling platform in a similar manner to how a remote control device today controls a television. However, the mobile device 314 and its associated applications creates a unique and customized user experience that enables the user to take his experience with him or her wherever the user happens to go such as to another person's house, another location, a vehicle, and/or different rooms of their own house. The user's media can be flung to any associated output device such as display and/or audio devices (e.g., display devices 112 and/or separate speakers/headphones 112a). The content may be located on the mobile devices 322, 330, and/or may be located at servers in the home 324, and/or in the cloud 310, 312.

Computing device or rendering device 320 (e.g., a set-top box, IP set-top box, gateway or other suitable device) may transcode, fling, and/or transport flung media. Rendering device 320 may be a standalone unit such as an associated AirPlay or BuddyBox type device, a rendering device unit, a gateway, and/or a set-top box which functions to render media to various output devices (speakers, displays, lights) under user control such as under control of mobile devices 322, 388, and/or fixed/mobile devices such as set-top box 340 and/or a remote control 342. While shown as a stand-alone device, the rendering device 320 may also be included in the access node 318. The rendering device 320 may be configured with various media interfaces such as DLNA, Airplay, wireless, and/or wired network interfaces to enable media to be flung to any suitable output device including displays, speakers, and/or lights. Each electronic device at the user premises 316 may be connected to one or both the access node 318 and the rendering device 320. When connected to the same network, each device can act in a coordinated manner.

The NAS 324 may be associated with the electronic device 322 and/or computing device(s) 330 and/or other various computing devices such as set-top boxes. Various devices connected to the same network as the NAS 324 may use the NAS 324.

Various servers such as server 310, 312, 105, 106, 107 and/or other media sources such as packet video source may be utilized to fling media under, for example, control by the various mobile/wireless devices. Further, the rendering devices may be under the control of a remote rendering device build server 314 which can dynamically reconfigure the rendering device to be more efficient depending on the types of media being flung and/or the devices associated with the rendering device. Servers such as the maintenance server 308 can also act as remote management servers that can do introspective analysis of a user's device. This includes the ability to reboot, re-flash software, and take over control for remote management needed for problem resolution. Additionally, these cloud components may be configured to 1) detect rendering devices across LANs/WANs, 2) access content across LANs/WANs, 3) stream content between LANs/WANs, and/or render the same content cross LANs/WANs and/or across disparate devices connected across LANs/WANs.

Figure 4:
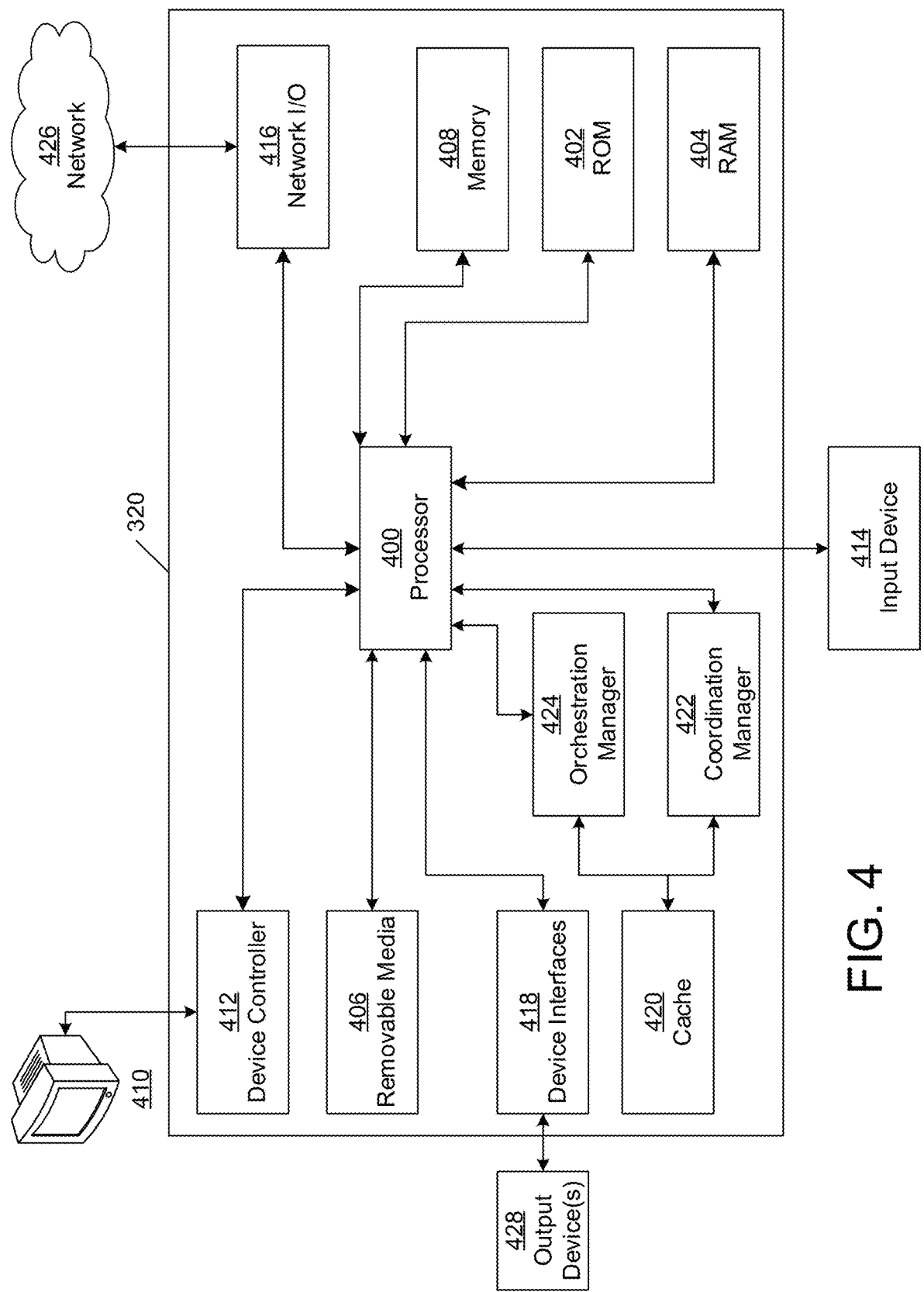
FIG. 4 illustrates an example rendering device according to various aspects of the disclosure described herein.

FIG. 4 illustrates an example of a rendering device 320 in accordance with some aspects of the disclosure. Features of the rendering device 320 may be implemented in a combination of hardware and/or software. Similar to the computing device 200, the rendering device 320 may include a processor 400, ROM 402, RAM 404, removable media 406, memory 408, display device 410, device controller 412, input device 414, network I/O 416, and a connection to a network 426. The rendering device 320 may further include device interfaces 418, a cache 420, orchestration manager 424, and coordination manager 422 and be connected to output device(s) 428 via device interface 418.

The device interfaces 418 may include wireless interfaces (e.g., Bluetooth interface), display device interfaces (e.g., composite video interface, component video interface, high-definition multimedia (HDMI) interface), and audio interfaces (e.g., 3.5 mm audio jack, optical audio jack). Examples of output devices 428 that may be connected via the device interfaces 418 include, for example, a display device connected via HDMI and audio speakers connected via an audio jack and/or Bluetooth.

The rendering device 320 may manage multiple output streams using a coordination manager 422 and/or an orchestration manager 424. The coordination manager 422 and the orchestration manager 424 may be implemented as instructions of a computer program executed by processor 400. The instructions for processor 400 may be stored in any type of computer-readable medium or memory, to configure the operation of the processor 400. For example, the instructions may be stored in the ROM 402, the RAM 303, or memory 308.

The coordination manager 422 may manage the input and output of the cache for the various flung media to the ultimate output device. The coordination manager 422 may determine and use the highest common denominator protocol in the multi-controller household.

The rendering device may initiate negotiation with the various connected mobile control devices over a series of diverse protocols to determine a set of mutually supported communication, streaming, and/or down sampling and transcoding protocols to use for flinging assets and protocols that are most compatible with other rendering devices and mobile devices that may also want to utilize those flung assets.

As an example, a first user may have a phone running an Android operating system which may send to a Miracast stack in the rendering device. A second user may be using a mobile device which does not support Miracast, and the second user may use DLNA instead or another protocol such as Airplay. A third user may have a third mobile device that might default to DLNA, Bluetooth, and/or WiFi. The coordination manager may attempt to use the highest common denominator protocol (the most supported protocol and/or the most used protocol) in a multi-controller setting with the rendering device able to handle contention between different flinging methods and handle a cache management for these assets in a manner that is device specific and optimized for the control application and protocol stacks on the devices.

The orchestration manager (e.g., server or processor) 424 may coordinate control commands associated with different control devices and supervise partitioning of the cache 420 which may be shared among different fling users. The orchestration manager 424 may accept streams originating from various sources including cloud media, mobile device media, and local media. The orchestration manager 424 may further include a mediation protocol stack containing rules for interrupting media, resuming media, and arbitrating between media. The orchestration manager 424 may convert commands from disparate protocol stacks into generic commands that may operate in a coordinated fashion on shared assets in the local and/or distributed cloud media caches. The orchestration manager 424 may be configured to utilize on a selectable basis the most efficient shared protocol available from both the currently selected mobile control device and the rendering devices.

In another example, a first user may attempt to fling a first asset in a first protocol, and a second user may simultaneously attempt to fling a second asset in a second protocol to the same output device. Where there are multiple different operating system enabled devices controlling the same rendering device and each supplying different media, the orchestration manager may arbitrate between the devices competing for a single resource. The orchestration manager 424 may use the mediation protocol stack with one or more predefined and/or user definable rules for interrupting media, going back to media, resuming media, and arbitrating between media in a coordinated and shared manner to allow the media to be consumed by the users. In one aspect, each user may control a portion of the display of an output device.

The multiple users flinging media to the rendering device may share a cache 420 at the rendering device 320. The determination of which files to cache and the timing of caching media may be performed as described in U.S. patent application Ser. No. 14/461,213, filed Aug. 15, 2014 (now U.S. Pat. No. 9,948,690) which is incorporated by reference in its entirety. The cache may be implemented in a portion of the memory in the rendering device or in a separate memory unit in the rendering device. The cache 420 may be operated in a manner to maintain privacy of data stored in the cache. In one aspect, portions of the storage capacity may be allocated to individual mobile devices and access to a mobile device's allocated storage capacity may be limited to the mobile device or the original flinging mobile device. For example, a first storage allocation may be to a first mobile device, and a second storage allocation may be to a second mobile device. Each mobile device may be assigned or have an identifier and/or be provided with privacy credentials such as a password, encryption key, etc.

In another aspect, the contents in the cache may have associated metadata and/or metadata tags indicating which device was the original flinging device. For example, the metadata may include an identifier of the mobile device from which the associated content in the cache originated. A user of a first mobile device may allow another user or the user of another device to access the cached content of the first mobile device. For example, the user of the first mobile device may share privacy credentials with the second user. The privacy credentials may be shared for a period of time and/or on a session basis before expiring. The privacy credentials may furthermore be limited to work only within a certain range or proximity of the device (e.g., display device, rendering device, audio device, etc.). Once the mobile device is outside of the range of the designated device, the credentials may automatically expire. The range may be a predefined range and/or defined by an ability to receive certain signals between the rendering device and the flinging device (e.g., within Bluetooth discoverable range, within range of the same wi-fi network).

The cache may be partitioned to include private storage areas and communal or public storage areas. For example, the cache may be partitioned to include private areas with access limited to the originating device and/or users with the appropriate credentials. The public areas may allow any user connected to the rendering device to access and fling the content stored in the public areas.

In some embodiments, the rendering device may be a generic standalone set-top box or integrated into a generic set-top box. The user may purchase the generic set-top box which can download software and/or firmware to personalize the set-top box to the user's selected service provider. The generic set-top box may have a serial number that may be compared with a subscriber identifier to determine the user's service provider.

In some aspects, a user outside of a user premises may fling media to a display device in a user premises or a mobile device of a user on a network may fling to a display device on a different network. For example, a first user outside of the user premises may select a second user to which media is to be flung such as by selecting the second user from the first user's address book. Once the second user accepts the fling, the media item would be delivered to the second user's device, and the second user's device can detect for compatible rendering and/or output devices in the user premises. The second user may view the fling session on the second user's mobile device and/or the second user can select an output device. If the second user selects an output device, the first user's device may fling the media directly to the rendering device attached to the output device.

In the event the display device is already being used, for example, to watch a video program (e.g., television show, movie) or by another media fling stream, a prompt may appear requesting permission from the user currently using the display device to allow a remote media fling to appear on the display device. Additionally, the video program being watched may be a broadcasted program or a live program, and the video program may be paused while media is being flung to the screen. A resume point may be created at the point in the video program at which the video program was paused or interrupted with flung media. The resume point may be used by the user to continue watching the video program at the interruption point. A recording device (e.g., digital video recorder (DVR), set-top box, rendering device) may begin recording the video program at the point in time that the remote fling begins. The recording may be a resume point to allow the user to later return to the point in the video program that was interrupted by the fling stream. For example, the recording device may have one or more tuners and may locally cache an interrupted video program and automatically and/or manually resume playback of the video program once the fling is completed.

Similarly, resume points may be created when a second media fling interrupts a first media fling. Each time a new media fling interrupts an existing media fling a resume point may be created, and the user may navigate between the resume points between different media flings. The resume points of different media flings may be provided in a listing including the name of the media that was flung, and timing information of the resume point, for example, the amount of time into the media and total runtime of the media for video and audio type media.

In some aspects, the mobile device or the device from which the media is flung may be used as the controller for the flung media. For example, the media device may be used to pause and/or resume playing of flung media content such as audio content (e.g., music, audiobooks, etc.) and/or video content (e.g., movies, television shows, video clips, etc.) and navigate (e.g., rewind, fast-forward, skip) media content as well. Distinct scenes in the video media may be automatically identified and presented on the electronic device. The scene level metadata (e.g., representative image, time code) may also be sent to the rendering device, which may display the metadata. As discussed above, a second user may fling while a first user is also flinging and the first user may be notified of the second fling on the mobile device. Using the mobile device, the first user can allow or deny the second fling.

When the fling session is started on the rendering device, the user may be notified that the fling session has started by a visual and/or audio notification (e.g., screen on the output device, audio tone). While the content is buffering, an image may be presented from the app (e.g., app icon) to let the user know which app initiated the fling. The rendering device may also present an image from the asset (e.g., thumbnail or jacket art) while buffering.

The mobile device may be used to end the fling session which may return the output device to its previous state. For example, if the user was watching a television show which was interrupted, the display device may return to displaying the television show at a resume point or at the current time point once the fling session has ended.

The controls for the fling session on the mobile device may be synchronized with the state of the player on the rendering device. The time code of video, state of play or resume, volume, and state of fling session (e.g., whether a fling session is active). This information may be synchronized with multiple devices consuming content from the rendering device.

The mobile device may have an identifier that is associated with the account of a service provider. The identifier may be used to automatically log the user into a particular network to enable immediate rendering device discovery and flinging and access to services and media of the service provider for flinging.

Figure 5:
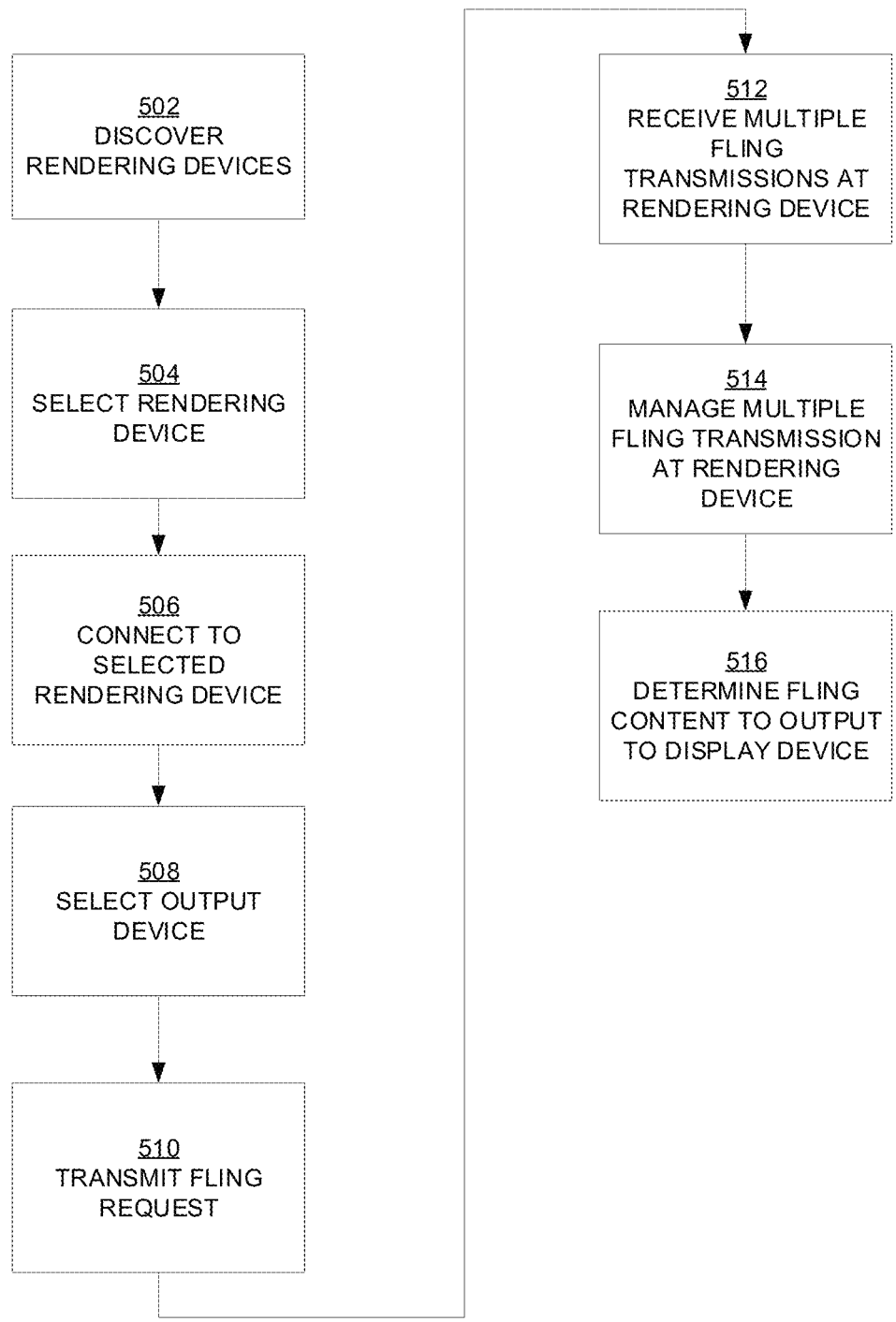
FIG. 5 illustrates an example method of flinging media from one or more electronic devices according to various aspects of the disclosure described herein.

FIG. 5 illustrates an example method of sending, transferring, or flinging media from one or more electronic devices 500. Steps 502-510 may be performed individually at each electronic device 322 including caching as described in U.S. patent application Ser. No. 14/461,213, filed Aug. 15, 2014 (now U.S. Pat. No. 9,948,690) which is incorporated by reference in its entirety. At step 502, the electronic device 322 may be located at the user premises 316, and the electronic device may discover the rendering devices operating at the user premises 316. The rendering devices 320 at the user premises 316 may be determined by identifying the rendering devices 320 connected to access node 318. The available rendering devices 320 on a network may be cached or stored on the mobile device 322 before the user begins any fling operations. The available rendering devices 320 may then be updated when the network to which the mobile device is connected changes. For example, upon launching an application to fling media, the user may be presented on the mobile device 322 with a list of available rendering devices to select using cached information. If the mobile device is not connected to the same network as the rendering device, for example, a wi-fi network at the user premises, the application may notify the user and prompt the user to confirm whether to continue using a cellular network or to connect to the wi-fi network.

According to another aspect, the mobile device 322 may be able to discover nearby rendering devices using a short-range wireless network (e.g., Bluetooth). Based on the Bluetooth signal strength, the mobile device may detect nearby rendering devices and/or output devices. A user might not have preselected the output device as the target fling output device. The mobile device may use triangulation using the Bluetooth signal to determine which output devices are physically within the same room as the mobile device. One or more these nearby output devices may be set as the target fling device. Alternatively, the user may be provided with a list of nearby output devices based on the Bluetooth discovery, and the user may select the output device(s). A default output device may be the last used device and/or the closest current device. A user may also select a default output device and/or rendering device for the user's fling streams. The default may further depend on the type of media being flung. For example, speakers may be the default for audio or music, and a display device may be the default for video.

Some embodiments may use location detection using a variety of different means (e.g., GPS based, Wi-Fi triangulation, Bluetooth). For example, a combination of Wi-Fi signal and Bluetooth signal strengths may be used to determine location.

In some aspects, the mobile device may store previous device discovery results for a network and allow the user to select from previous device discovery results to more quickly begin the fling process since searching for available discovery devices at the beginning of each fling may unnecessarily delay the fling process. The user may be able to select an option to refresh the device discovery, and the mobile device may perform a fresh search for available discovery devices when the network to which the mobile device is connected changes.

At step 504, the electronic device 322 or the user can select the rendering device from the discovery results. At step 506, the electronic device 322 can connect to the selected rendering device. At step 508, the electronic device 322 can receive information from the rendering device 320 of the output devices connected to the rendering device. From the information of the output devices, the electronic device can select the destination output device(s) for the flung content.

At step 510, the user can select the fling media to fling. The media to fling may be transformed (e.g., processed, transcoded, re-sampled, re-encapsulated, etc.) into the appropriate format(s) for the destination output device and the network connection as described in U.S. patent application Ser. No. 14/461,207, filed Aug. 15, 2014 (now U.S. Pat. No. 9,906,575) which is incorporated by reference in its entirety. The electronic device 322 may transmit a fling request. At step 512, the rendering device 320 may receive one or more fling transmissions (e.g., streams or file-based transmissions) from one or more electronic devices 322a-c. The transmissions may be to the same or different output devices.

At step 514, the rendering device 320 may use different ways of managing the multiple fling transmissions and determining fling content to output at each output device and the order in which to output the different content streams. For example, the rendering device may have each user take turns outputting one media item. Each media item may be played in its entirety before the next media item is output or a user-defined delay may occur before the next media item is played. As another example, the rendering device may complete output of a playlist for a first user, and then move on to the playlist of the next user. In another example, the user most closely associated with the rendering device may be given a higher priority than users not associated with an account associated with the rendering device. For example, a user whose mobile device is also associated with the same account as the rendering device may be given higher priority than other users whose devices are not associated with the same account as the rendering device.

According to yet another aspect, one user may be given master control of the media to be output by the rendering device. For example, as each user flings a media item to the rendering device, the name of the media item may appear on the mobile device of the user given the master control (e.g., in a list). The master control user may determine the order of the media to be played and which media is to be played as well as control playback of the media (e.g., pause, skip, fast forward, rewind). Mobile device with the master control may be updated with the current or real-time playback status of the media (e.g., runtime, paused, playing). The master control user may arrange the fling requests in a playlist.

In some aspects, users may be required to pay a fee in order to fling a song to a rendering device. This may be done in, for example, a party or club environment where the rendering device determines the music played on the speakers in the party or club.

In some aspects, the rendering device 320 may receive a single fling stream to output at multiple output devices simultaneously or in synchronization with each other. For example, audio media flung to the rendering device 320 may be outputted from more than one speaker and/or speaker set. As another example, audiovisual media may be displayed on the display device, and the accompanying audio component of the audiovisual media may be played on the speakers.

At step 516, the rendering device may output the flung content to the selected output devices (e.g., display devices, audio devices). The indication of which output devices are selected (e.g., identifiers of output devices) may be included in the fling request.

Figure 6:
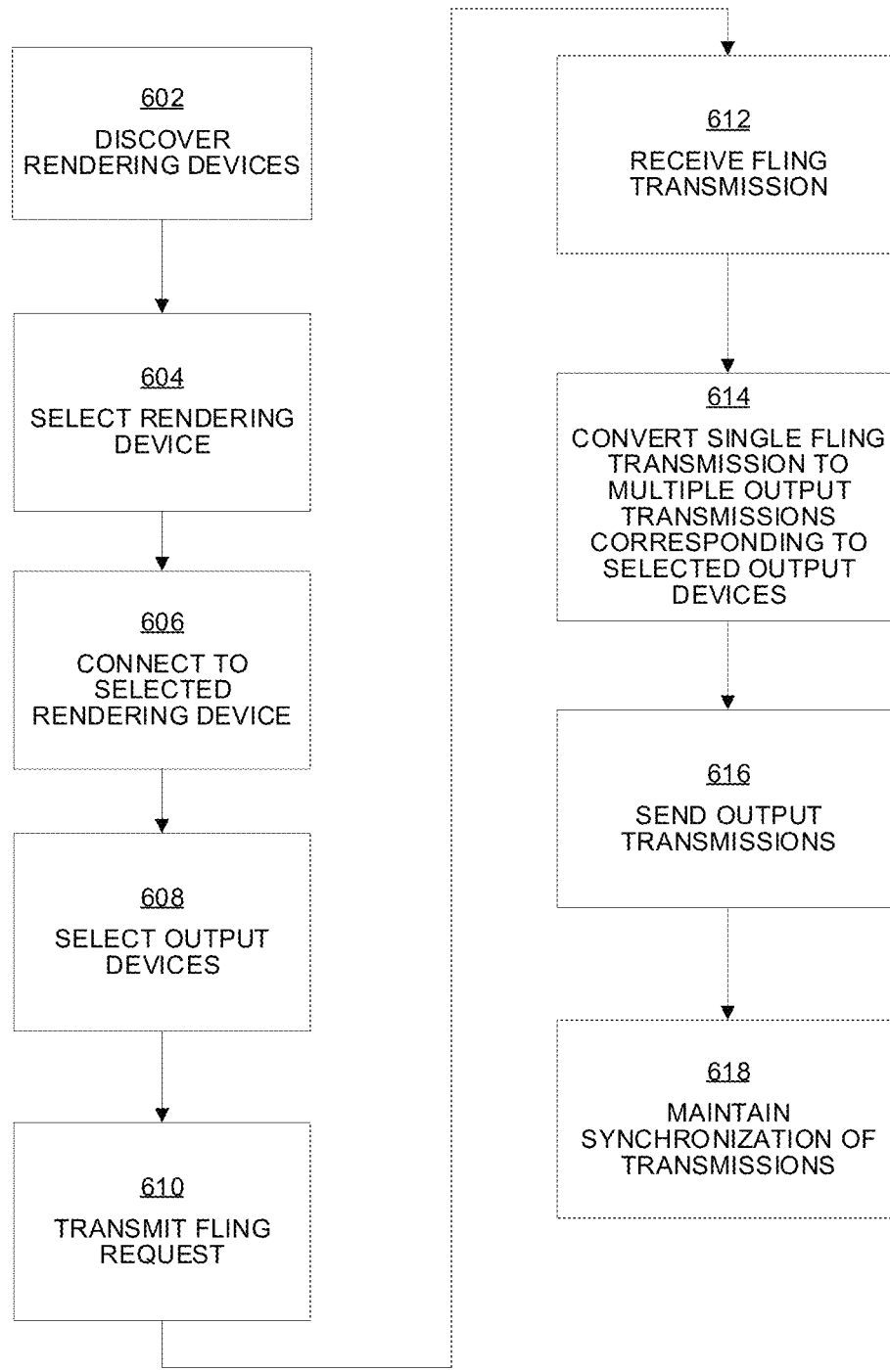
FIG. 6 illustrates an example method for synchronized output of media according to various aspects of the disclosure described herein.

FIG. 6 illustrates an example method for synchronized output of media 600. Steps 602, 604, 606, and 608 are similar to steps 502, 504, 506, and 508 respectively. The electronic device 322 may transmit a fling request at step 610, and the rendering device may receive the fling transmission at step 612. The fling transmission may be, for example, a stream and/or a file-based transfer. At step 614, the rendering device may convert the single fling stream to multiple output streams corresponding to the selected output devices. Output devices may be organized into zones each zone may correspond to a particular area of the user premises (e.g., a room, a floor, outdoors, indoors). A user may select one or more zones to which media is to be flung.

Certain protocols that may be preferred for fling streams might not support synchronized streaming (e.g., DLNA, Miracast). In response to the user selecting multiple output devices, the media fling system may use a protocol different from the preferred protocols that supports synchronized streaming to multiple output devices such as PulseAudio and Apple's Airplay. The fling media system may further include extensions on the fling application and the rendering device to allow for synchronization of multiple simultaneous video and/or audio outputs which may optionally include switching to a different streaming protocol to support the use case.

At step 614, the rendering device may receive a single fling transmission to output simultaneously to multiple output devices while maintaining synchronization of the output transmission. At step 616, the rendering device may transmit or send the output transmissions to the selected output devices.

At step 618, the synchronization of the transmissions between multiple output devices may be maintained by the rendering device or the mobile device. Various mechanisms may be used to maintain synchronization of the stream output from the output devices. For example, a master-slave scheme may be used to maintain synchronization of the streams. A stream and/or device may serve as the master and the other outputs may be slaves. The electronic device, rendering device, and output devices may be configured as a synchronizing slave sending out a timing clock to other output devices to ensure the audio is output synchronously to all output devices. A device (e.g., set-top box, rendering device) that is persistently connected to the network may be selected to provide the timing clock. The output device may have a microphone to listen to other audio devices and filter out its own output to detect when the other audio devices are out of phase with the output device.

In another example, where the users are outside of the user premises and flinging media to multiple output devices, the mobile device may assume the master control role or a master device in the cloud may assume this role. When the user is in the user premises, the network may provide a central clock. In the instance where the users are outside of the user premises and are flinging media to multiple output devices, the mobile device may provide the time synchronization signal.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
  receiving, by a computing device and from a first requesting device, a first request indicating first content to be output;
  receiving, by the computing device and from a second requesting device, a second request indicating second content to be output;
  determining, by the computing device and based on the first request and the second request, that the first requesting device will determine which of the first content and the second content will be output;
  sending, to the first requesting device and based on the determining, information identifying the first content and the second content;
  receiving, from the first requesting device, the first content and information indicating that the first content is to be output; and
  causing, based on the received information, output of the first content.

2. The method of claim 1, further comprising receiving, from the first requesting device, a playlist arranging the first content and the second content in an order to be output, wherein the causing output of the first content is based on the order.

3. The method of claim 1, further comprising facilitating the first requesting device to control output of the first content.

4. The method of claim 1, wherein the causing output comprises causing the second requesting device to send the second content directly to a rendering device attached to an output device associated with the second request.

5. The method of claim 1, further comprising:
  creating a resume point indicating a point, in a program, at which output of the program was interrupted by the first content; and
  using the resume point to resume output of the program after output of the first content.

6. The method of claim 1, wherein the first request requests synchronized output, via a plurality of different displays, of the first content.

7. The method of claim 1, further comprising causing synchronized output, via a plurality of different devices, of the first content.

8. One or more non-transitory, computer-readable media storing instructions that, when executed, cause:
  receiving, by a computing device and from a first requesting device, a first request indicating first content to be output;

receiving, by the computing device and from a second requesting device, a second request indicating second content to be output;

determining, by the computing device and based on the first request and the second request, that the first requesting device will determine which of the first content and the second content will be output;

sending, to the first requesting device and based on the determining, information identifying the first content and the second content;

receiving, from the first requesting device, the first content and information indicating that the first content is to be output; and causing, based on the received information, output of the first content.

9. The one or more non-transitory, computer-readable media of claim 8, wherein the instructions, when executed, further cause receiving, from the first requesting device, a playlist arranging the first content and the second content in an order to be output, and wherein the causing output of the first content is based on the order.

10. The one or more non-transitory, computer-readable media of claim 8, wherein the instructions, when executed, further cause facilitating the first requesting device to control output of the first content.

11. The one or more non-transitory, computer-readable media of claim 8, wherein the instructions, when executed, cause the output by causing the second requesting device to send the second content directly to a rendering device attached to an output device associated with the second request.

12. The one or more non-transitory, computer-readable media of claim 8, wherein the instructions, when executed, cause:
creating a resume point indicating a point, in a program, at which output of the program was interrupted by the first content; and
using the resume point to resume output of the program after output of the first content.

13. The one or more non-transitory, computer-readable media of claim 8, wherein the first request requests synchronized output, via a plurality of different displays, of the first content.

14. The one or more non-transitory, computer-readable media of claim 8, wherein the instructions, when executed, further cause synchronized output, via a plurality of different devices, of the first content.

15. A system comprising:
a first requesting device and a computing device, wherein the first requesting device is configured to send a first request indicating first content to be output; and
wherein the computing device comprises:
one or more processors; and
memory storing instructions that, when executed by the one or more processors, configure the computing device to:
receive the first request;
receive, from a second requesting device, a second request indicating second content to be output;
determine, based on the first request and the second request, that the first requesting device will determine which of the first content and the second content will be output;
send, to the first requesting device and based on the determining, information identifying the first content and the second content;
receive, from the first requesting device, the first content and information indicating that the first content is to be output; and
cause, based on the received information, output of the first content.

16. The system of claim 15, wherein the instructions, when executed by the one or more processors, further configure the computing device to receive, from the first requesting device, a playlist arranging the first content and the second content in an order to be output, and wherein the causing output of the first content is based on the order.

17. The system of claim 15, wherein the instructions, when executed by the one or more processors, further configure the computing device to facilitate the first requesting device to control output of the first content.

18. The system of claim 15, wherein the instructions, when executed by the one or more processors, further configure the computing device to cause the output by causing the second requesting device to send the second content directly to a rendering device attached to an output device associated with the second request.

19. The system of claim 15, wherein the instructions, when executed by the one or more processors, further configure the computing device to:
create a resume point indicating a point, in a program, at which output of the program was interrupted by the first content; and
use the resume point to resume output of the program after output of the first content.

20. The system of claim 15, wherein the first request requests synchronized output, via a plurality of different displays, of the first content.

21. The system of claim 15, wherein the instructions, when executed by the one or more processors, further configure the computing device to synchronize output, via a plurality of different devices, of the first content.

22. A computing device comprising:
one or more processors; and
memory storing instructions that, when executed by the one or more processors, configure the computing device to:
receive, from a first requesting device, a first request indicating first content to be output;
receive, from a second requesting device, a second request indicating second content to be output;
determine, based on the first request and the second request, that the first requesting device will determine which of the first content and the second content will be output;
send, to the first requesting device and based on the determining, information identifying the first content and the second content;
receive, from the first requesting device, the first content and information indicating that the first content is to be output; and
cause, based on the received information, output of the first content.

23. The computing device of claim 22, wherein the instructions, when executed by the one or more processors, further configure the computing device to receive, from the first requesting device, a playlist arranging the first content and the second content in an order to be output, and wherein the causing output of the first content is based on the order.

24. The computing device of claim 22, wherein the instructions, when executed by the one or more processors, further configure the computing device to facilitate the first requesting device to control output of the first content.

25. The computing device of claim 22, wherein the instructions, when executed by the one or more processors, further configure the computing device to cause the output by causing the second requesting device to send the second content directly to a rendering device attached to an output device associated with the second request.

26. The computing device of claim 22, wherein the instructions, when executed by the one or more processors, further configure the computing device to:
- create a resume point indicating a point, in a program, at which output of the program was interrupted by the first content; and
- use the resume point to resume output of the program after output of the first content.

27. The computing device of claim 22, wherein the first request requests synchronized output, via a plurality of different displays, of the first content.

28. The computing device of claim 22, wherein the instructions, when executed by the one or more processors, further configure the computing device to synchronize output, via a plurality of different devices, of the first content.

* * * * *